(12) United States Patent
Wrocklage

(10) Patent No.: US 6,568,656 B1
(45) Date of Patent: May 27, 2003

(54) FLOW CONTROL VALVE WITH LATERAL PORT BALANCING

(75) Inventor: David P. Wrocklage, St. Louis, MO (US)

(73) Assignee: Sporlan Valve Company, Washington, MO (US)

( * ) Notice: Subject to any disclaimer, the term of this patent is extended or adjusted under 35 U.S.C. 154(b) by 0 days.

(21) Appl. No.: 09/112,601

(22) Filed: Jul. 9, 1998

(51) Int. Cl.[7] ............................................... F16K 39/02
(52) U.S. Cl. ......................................... 251/282; 251/121
(58) Field of Search .................................. 251/282, 121

(56) References Cited

U.S. PATENT DOCUMENTS

| | | | |
|---|---|---|---|
| 647,706 A | * 4/1900 | Robertshaw | ................. 251/282 |
| 3,194,499 A | * 7/1965 | Noakes | .................... 251/282 X |
| 3,402,566 A | * 9/1968 | Leimbach | .................... 62/197 |
| 3,738,573 A | * 6/1973 | Eschbaugh et al. | ..... 251/282 X |
| 3,742,722 A | * 7/1973 | Leimbach | .................... 62/225 |
| 3,967,782 A | * 7/1976 | Eschbaugh et al. | ..... 251/282 X |
| 3,988,002 A | * 10/1976 | Kahoun | ........................ 251/282 |
| 4,311,297 A | * 1/1982 | Barrington | .............. 251/282 X |
| 4,593,881 A | * 6/1986 | Yoshino | ................. 251/282 X |
| 4,852,364 A | * 8/1989 | Seener et al. | ........... 251/282 X |
| 4,911,404 A | * 3/1990 | Dorste et al. | ........... 251/282 X |
| 5,540,412 A | * 7/1996 | Doll | ........................ 251/282 X |
| 5,556,075 A | * 9/1996 | Weber | .................... 251/282 X |
| 5,706,855 A | * 1/1998 | Heiniger | ................. 251/282 X |

* cited by examiner

Primary Examiner—John Rivell
(74) Attorney, Agent, or Firm—Polster, Lieder, Woodruff & Lucchesi, L.C.

(57) ABSTRACT

This flow control valve (10) may be used in refrigeration systems (200) as an expansion valve or as a hot gas by-pass valve. The valve (10) includes a body (16) having an inlet (34), an outlet (36), a communicating passage between the inlet (34) and outlet (36), the passage having a valve seat (30). The valve includes a piston chamber (22) and a piston (12) mounted in the piston chamber for movement toward and away from the valve seat. The piston (12) includes an equalization passage (60), extending between an upper port (66) communicating with the piston chamber (22), and a lower port (64). In the open position, piston modulation relative to the valve seat (30) creates a variable zone of low pressure in the area between the valve seat (30) and the piston nose piece (42), which is lower than inlet pressure. The lower piston port (64), which is laterally disposed, communicates with the lower pressure zone to control the resultant force on the piston (12).

7 Claims, 8 Drawing Sheets

FLOW CONTROL VALVE WITH LATERAL PORT BALANCING

BACKGROUND OF THE INVENTION

This invention relates generally to flow control valves for refrigeration systems and particularly to a valve having a passage through the piston arranged to provide a superior balancing system to reduce loading on the motor means.

In the prior art valves are known which provide a piston and valve port between the inlet and outlet for controlling refrigerant flow through the valve. The piston is subjected to pressure from various sources to control movement of the piston between an open and a closed position. It is an advantage to provide a balancing force on the remote side of the piston tending to equalize the force on the inlet side of the piston resulting from inlet pressure. Essentially, the equalizing force is provided by means of an equalizing passage through the piston and by providing a pressure surface on each side of the piston, which is subjected to the inlet pressure.

Two known examples of such force balancing systems in thermostatic expansion valves are provided by U.S. Pat. Nos. 3,402,566 and 3,742,722, both valves having limited stroke from the mechanical action of the diaphragm. In U.S. Pat. No. 3,402,566 the pressure surface on the inlet side of the piston and the pressure surface on the remote side of the piston are connected by a communicating passage. The pressure surface areas are arranged so that when the valve is in the closed position, the area on the inlet side of the piston is less than the area on the remote side resulting in a net force tending to maintain the valve in the closed position. When the valve is in the open position, the pressure surface areas on each side of the valve are arranged to be the same providing a balanced force on the piston from inlet pressure.

In U.S. Pat. No. 3,742,722, a piston having a passage between two opposed pressure surfaces is disclosed and there is a similar arrangement to that for U.S. Pat. No. 3,402,566, except that the piston of U.S. Pat. No. 3,742,722 is provided with a nose piece which is selectively shaped to determine the valve flow capacity.

Another known expansion valve of interest is U.S. Pat. No. 4,911,404 which also includes an equalization passage through the piston and which is driven by a stepper motor actuator. These three commonly owned patents are incorporated herein by reference.

The present valve piston balancing system represents an improvement over these prior art valves and other similar valves in a manner not disclosed in the known prior art.

SUMMARY OF THE INVENTION

This flow control valve for a refrigeration system provides a balanced piston system by utilizing an equalization passage having a valve port in the piston communicating with the inlet and located to facilitate controlled pressure distribution in the valve operation thereby reducing load on the actuator.

The flow control valve comprises a body including an inlet, an outlet, and a passage communicating between the inlet and outlet and a valve chamber. The valve includes a valve port in the passage defined by a valve seat; a piston movably mounted in the valve chamber; and actuator means for moving the piston toward and away from the valve seat. The piston includes an equalization passage with an upper port and a lower port, the piston being capable of modulation in an open position in which the piston is spaced from the valve seat to define a zone of pressure lower than the inlet pressure. The upper port communicates with the valve chamber during modulation, and the lower port communicates with the zone of low pressure during modulation to provide a selected pressure variation in the valve chamber.

It is an aspect of this invention to provide that the equalization passage includes a lateral passage defining the lower port.

It is another aspect of this invention to provide that the piston includes a nose piece having a frusto-conical configuration.

It is yet another aspect of this invention to provide that the piston includes an outer portion and an inner portion interfitting the outer portion, the inner portion providing the frusto-conical nose piece.

It is still another aspect of this invention to provide that the equalization passage includes a lateral passage extending through the frusto-conical nose piece defining opposed ports.

It is an aspect of this invention to provide that the nose piece includes an end face and the lateral port is disposed a predetermined distance from the end face to selectively locate the lower ports relative to the valve seat.

It is an aspect of this invention to provide that the flow control valve may be used in a refrigeration system having a compressor, a condenser, an evaporator, the flow control valve providing an expansion valve operatively connected between the high pressure condenser side and the low pressure evaporator side.

It is another aspect of this invention to provide that the piston is movable from a closed position, in which the piston operatively engages the valve seat, and an open position in which the piston is spaced from the valve seat to define a zone of low pressure lower than the inlet pressure, the upper port communicating with the valve chamber when the piston is in a closed position and when the piston is in an open position, and the lower port communicating with the inlet chamber when the piston is in a closed position and the lower port communicating with the zone of low pressure when the piston is in an open modulating position to provide a selected pressure in the valve chamber to reduce imbalance forces.

It is an aspect of this invention to provide that the actuator means includes a stepper motor.

This flow control valve with lateral port balancing is inexpensive to manufacture, easy to install and operates efficiently for its intended purpose. The valve may be used in a refrigeration system as an expansion valve or a hot gas by-pass valve.

DESCRIPTION OF THE PREFERRED EMBODIMENT

Figure 1:
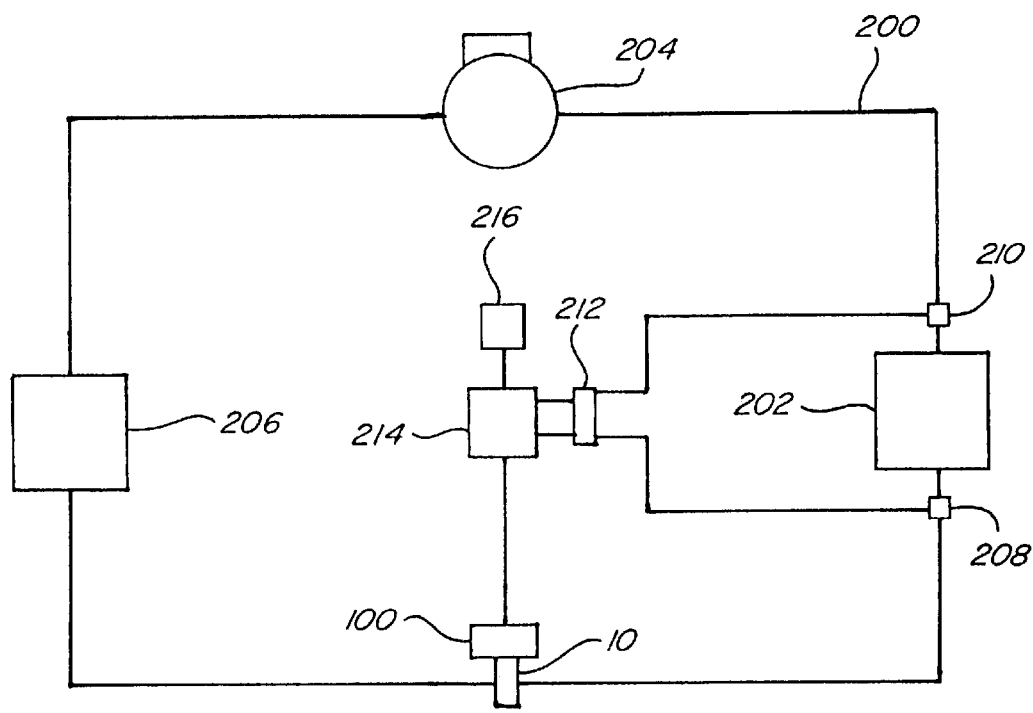
FIG. 1 is a diagrammatic representation of a refrigeration system in which the improved flow control valve is applied as an expansion valve.

Referring now by reference numerals to the drawings and first to FIG. 1, it will be understood that the flow control expansion valve may be utilized in a refrigeration system using a stepper motor similar to that shown in U.S. Pat. No. 4,911,404 which is incorporated by reference herein.

Figure 1A:
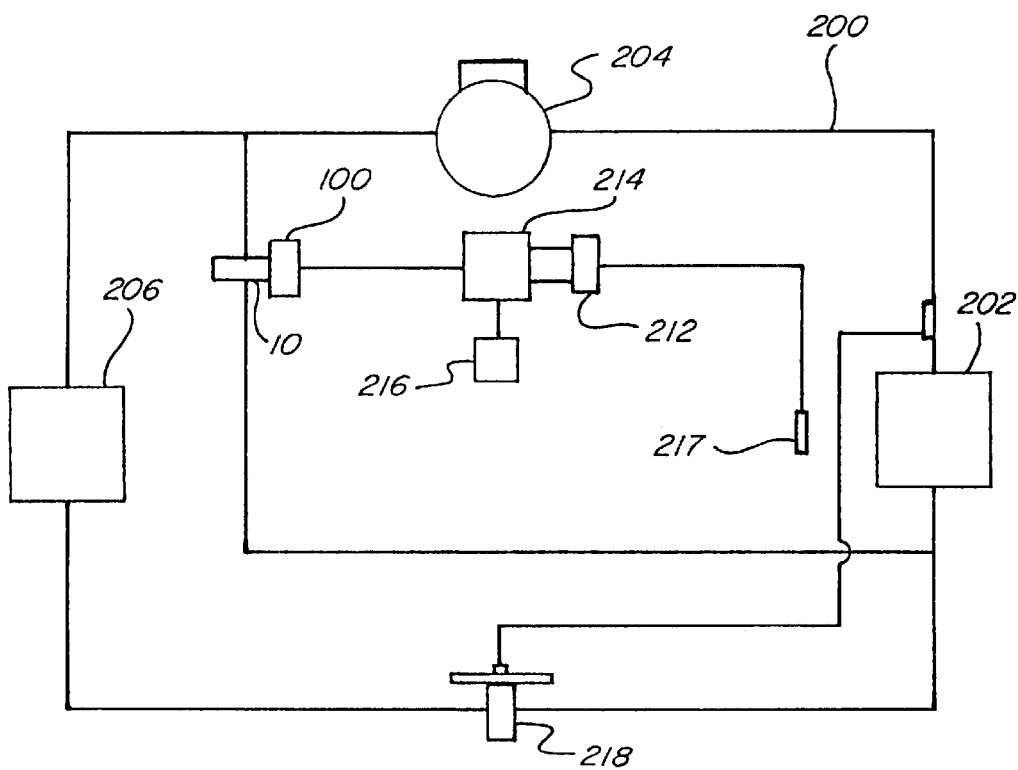
FIG. 1A is similar to FIG. 1 except that the valve is applied as a hot gas by-pass valve.

As shown in FIG. 1, the expansion valve 10 may be used in a refrigeration system 200 which includes an evaporator 202, a compressor 204, and a condenser 206. An expansion valve stepper motor 100 is responsive to temperature sensors 208 and 210 which input to a microprocessor 212. The microprocessor 212 is connected to an electronic switch device 214, disposed between a power supply 216 and the stepper motor 100. Alternatively, as shown in FIG. 1A, the valve can be a hot gas by-pass valve. In this case an air temperature sensor 217, and a mechanical thermostatic expansion valve 218 are provided. In both cases, flow control is provided at high flow, high pressure drop conditions.

Figure 2:
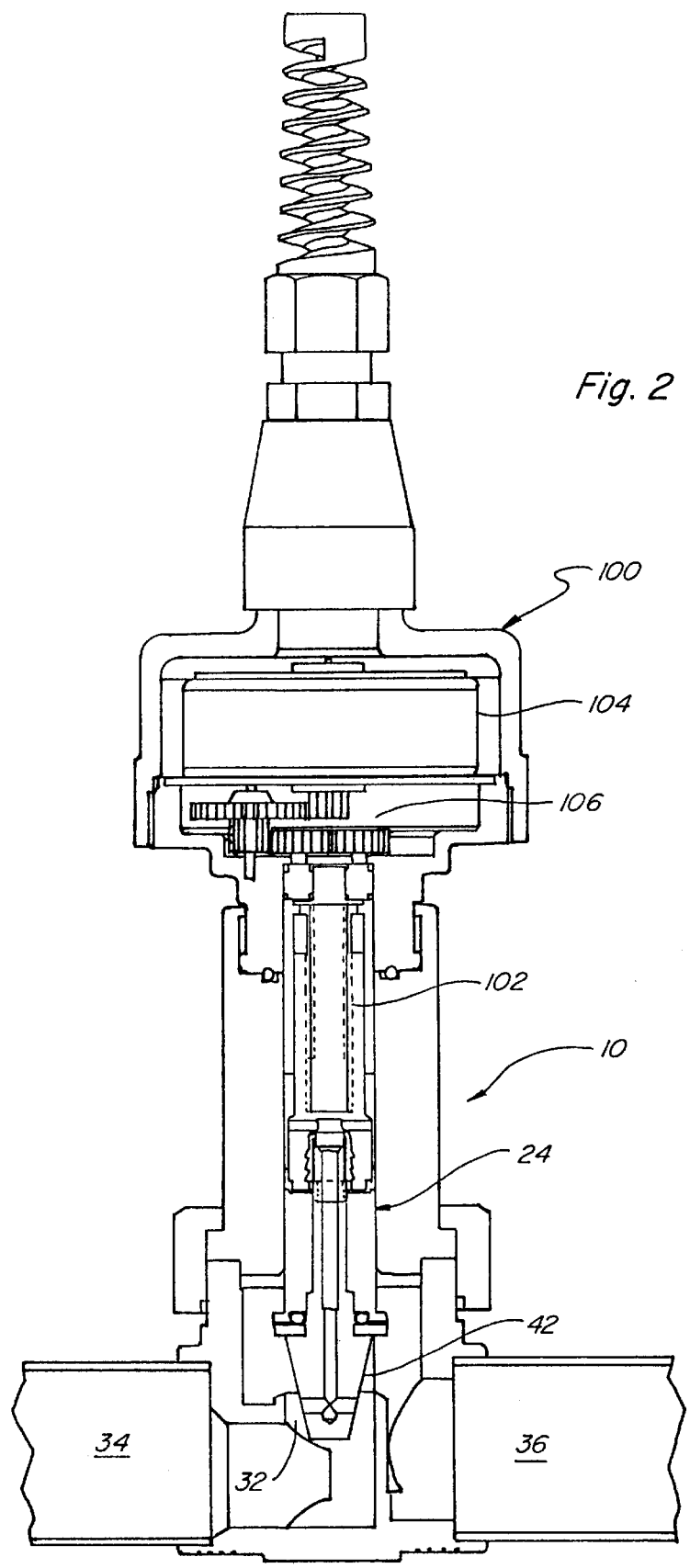
FIG. 2 is an elevational view of the expansion valve with a stepper motor actuator.
Figure 3:
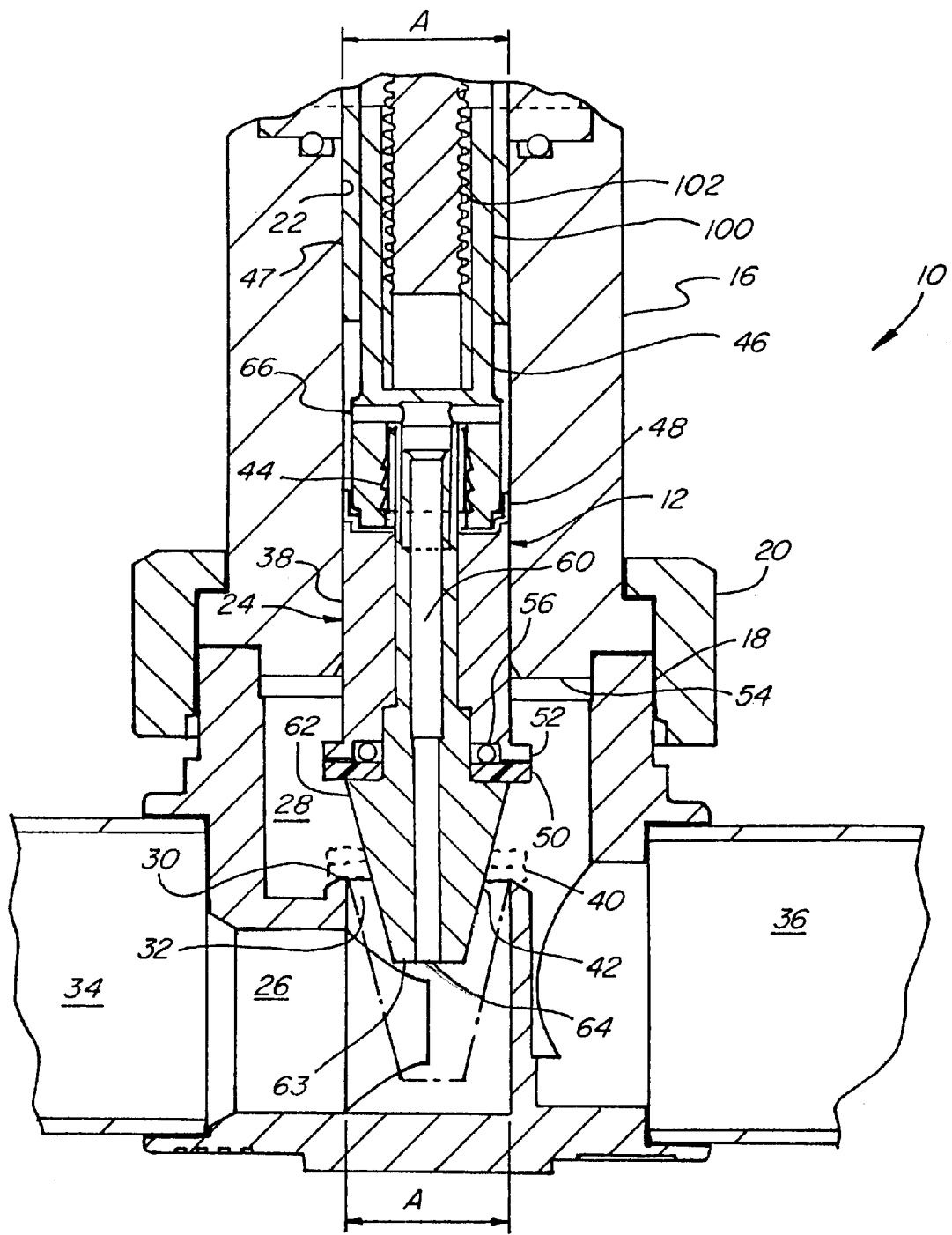
FIG. 3 is an enlarged cross-sectional view of a stepper motor actuated valve with a piston assembly provided with an axial lower port.
Figure 4:
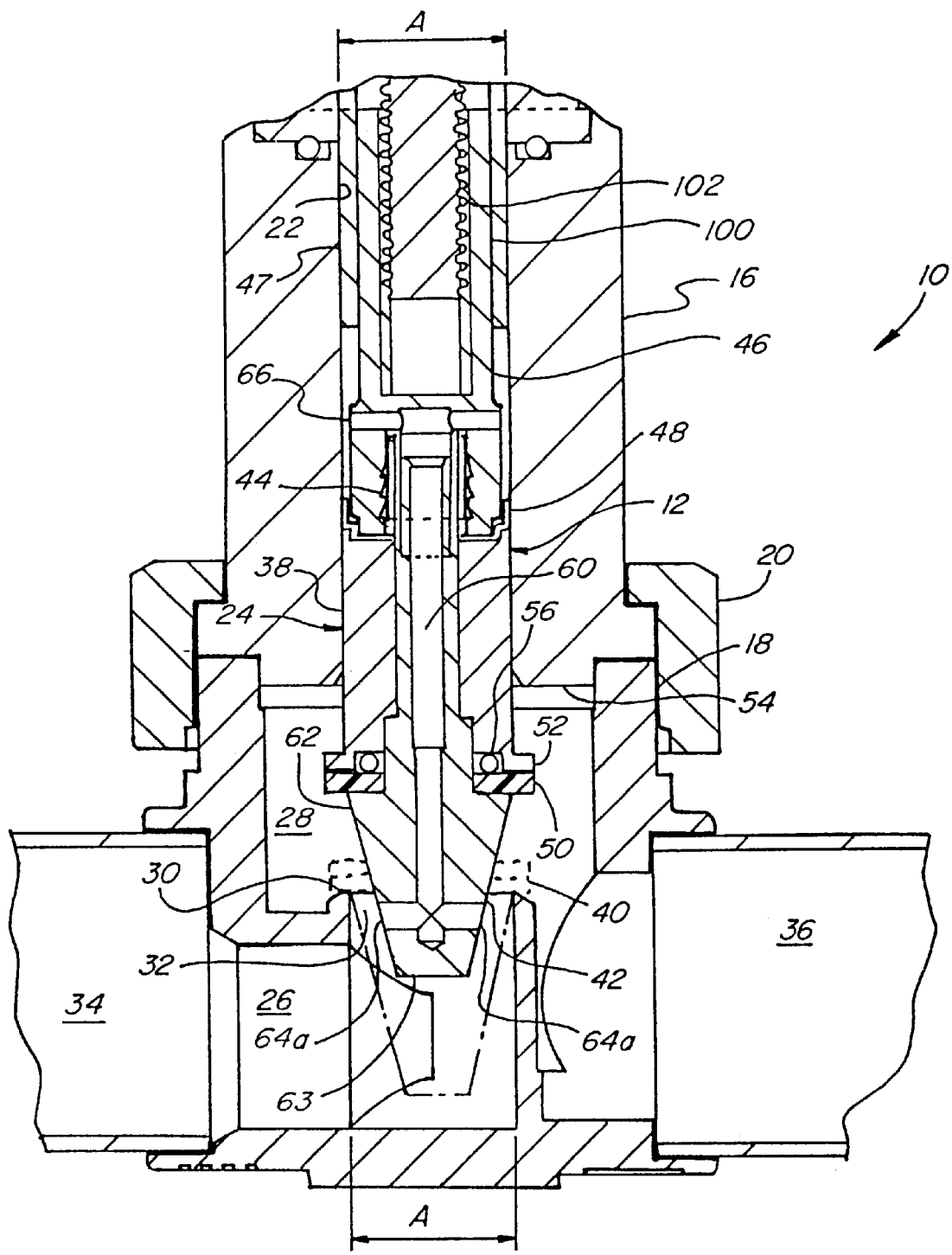
FIG. 4 is a similar view of the valve with a piston assembly provided with a lateral lower port.

Referring more specifically to the enlarged detail of the parts of the expansion valve 10 shown in FIG. 3 it will be understood that a valve assembly 12 is surmounted by the stepper motor assembly 100. FIG. 2 indicates the stepper motor assembly 100 which includes a lead screw 102 rotated by motor 104 through the medium of a gear assembly 106. A stepper motor drive system of this type is shown in commonly-owned U.S. Pat. No. 4,911,404 which is incorporated herein by reference.

More particularly, the valve assembly 12 includes an upper body portion 16 and a lower body portion 18 connected by a nut 20. The upper body portion 16 includes a cylindrical passage 22, which receives a piston assembly 24 in sliding relation.

In the embodiment shown in FIG. 3, the lower body portion 18 is formed into an inlet chamber 26 and cooperates with the upper body portion to form an outlet chamber 28. The chambers 26 and 28 are separated by a valve seat 30 defining a valve port 32 which communicates between the inlet chamber 26 and the outlet chamber 28. As shown, the inlet chamber 26 communicates with the inlet line 34 on the high pressure (condenser) side and the outlet chamber 28 communicates with the outlet line 36 on the low pressure (evaporator) side.

The piston assembly 24 includes an exterior cylindrical body 38 receiving an interior stepped body 40 compatibly formed to be received within the exterior body 38. The stepped body 40 includes a nose piece 42 at one end and a threaded stem 44 at the other, remote, end and is held in place within the exterior body 38 by an adaptor portion 46 which is provided with a piston seal 48. The non-rotatable adaptor portion 46 is non-circular and is internally threaded to receive the rotating lead screw 102 of the stepper motor assembly 100. The adaptor portion 46 is held against rotation by a guide member 47.

The piston nose piece 42 includes an annular abutment 50, which is disposed between the nose piece 42 and an annular abutment 52 on the exterior body 38 which provides a stop engageable with the lower face 54 of the upper body portion 16. When the stop 52 engages the face 54, the stroke is defined by the distance from the underside of the piston annular abutment 50 and the valve seat 30. A sealing ring 56 is disposed between the exterior cylindrical body 38 and the nose piece abutment 50.

In the valve assembly shown in FIG. 3 the piston assembly 24 includes an equalization passage 60, which extends axially through the piston interior body 40 and communicates with a transverse passage 66 in the adaptor 46 providing an upper port. The nose piece 42 has the configuration of a truncated cone and includes a conical face 62, an end face 63, and a lower port 64.

In the closed position shown in phantom outline in FIG. 3, the piston area subjected to the inlet pressure is defined by the diameter of the valve port 32 indicated by A. The diameter of the passage in which the piston slides is the same diameter, also indicated by A. Accordingly, in its closed position with the disposition of parts shown, the pressure areas above and below the piston are equal and, in the closed position, the piston is balanced, both ends being subjected to inlet pressure.

There are applications in which the valve is required to modulate during high flow, high pressure drop conditions, and it has been discovered that the arrangement, and particularly the location of the equalization passage lower port 64 in the nose piece, has a dramatic effect on the piston balance when the valve is in the open position.

Figure 5:
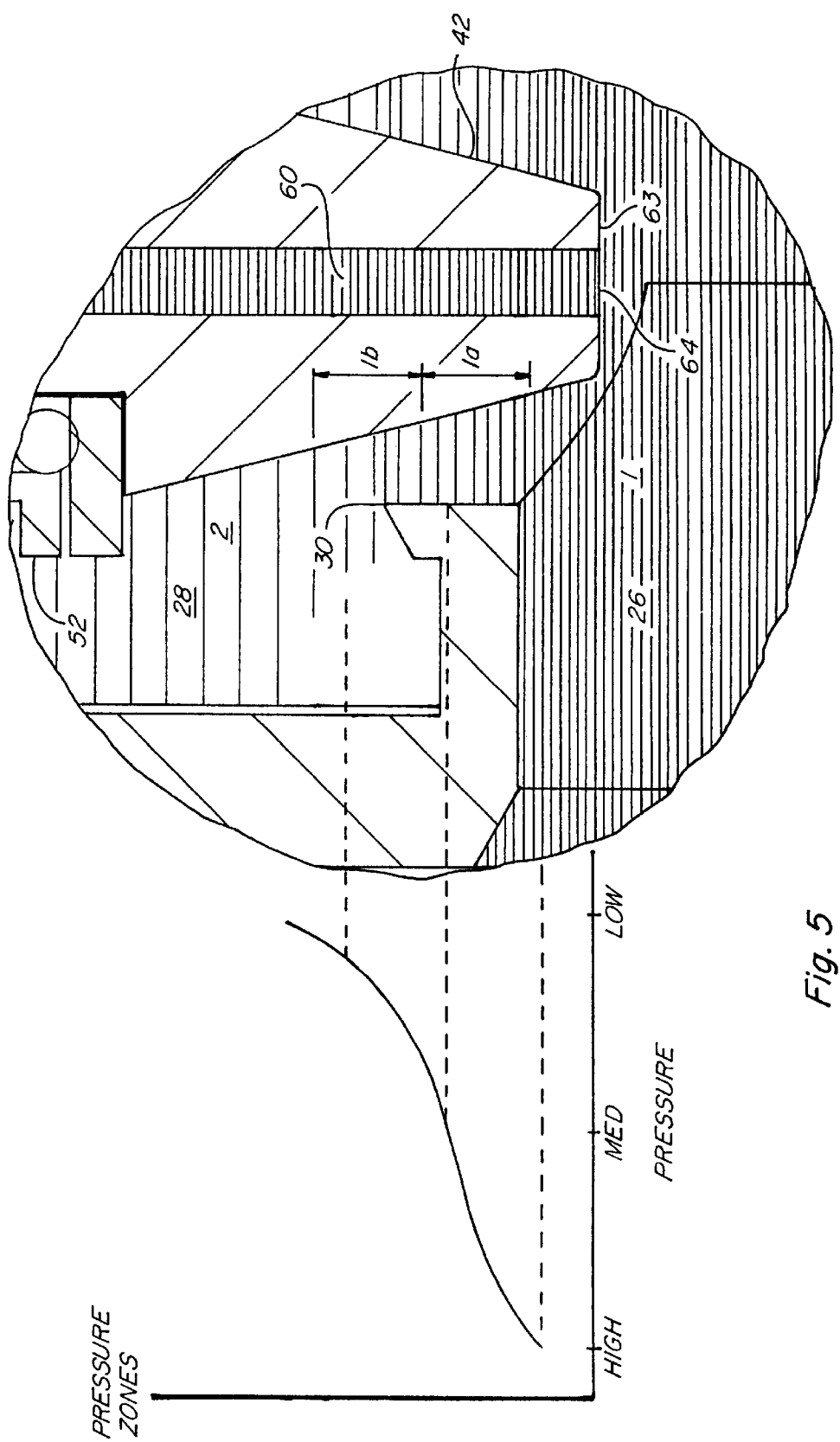
FIG. 5 is an enlarged fragmentary view of the piston assembly of FIG. 3.
Figure 6:
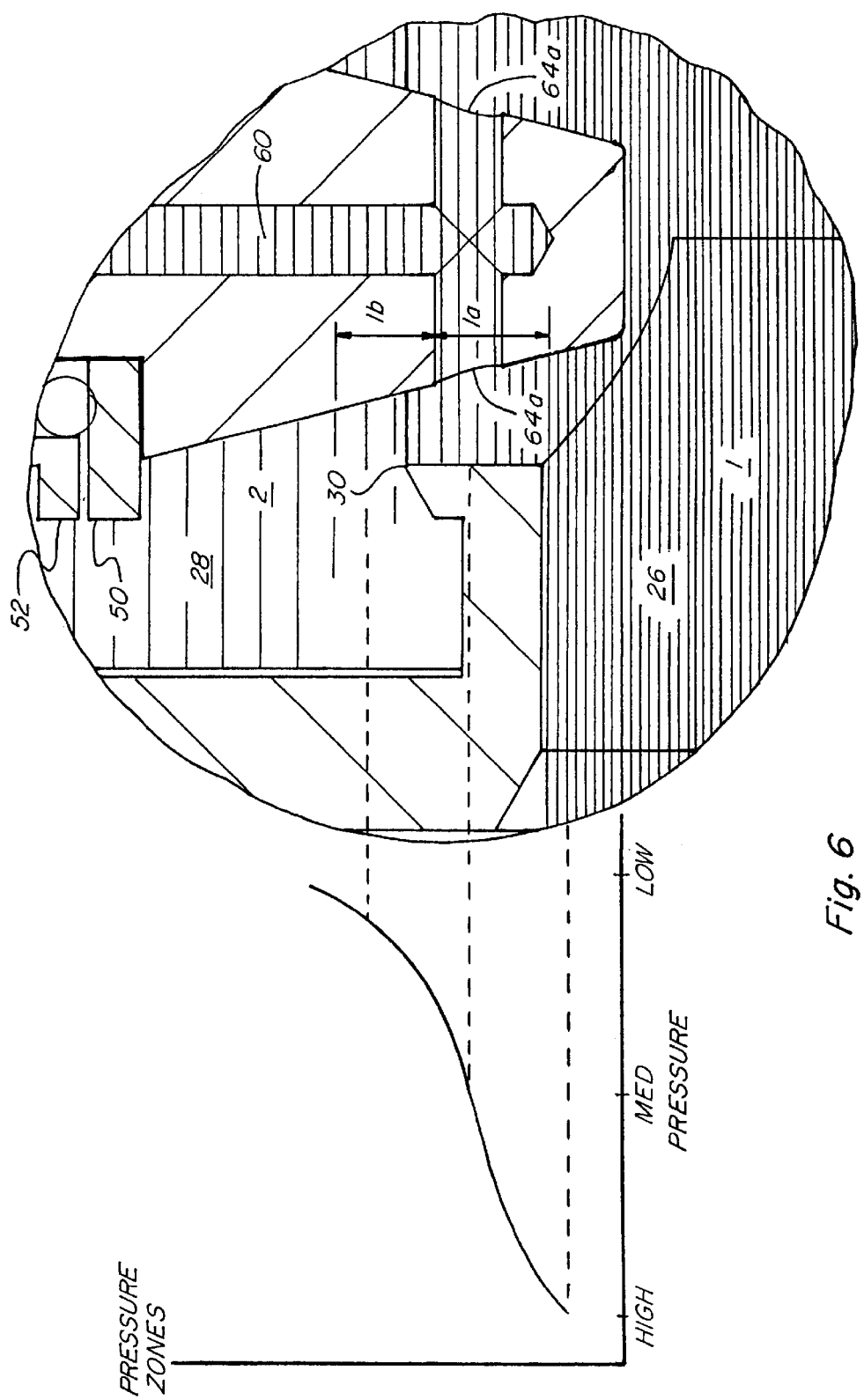
FIG. 6 is an enlarged fragmentary view of the piston assembly of FIG. 4 with the valve in one position.
Figure 7:
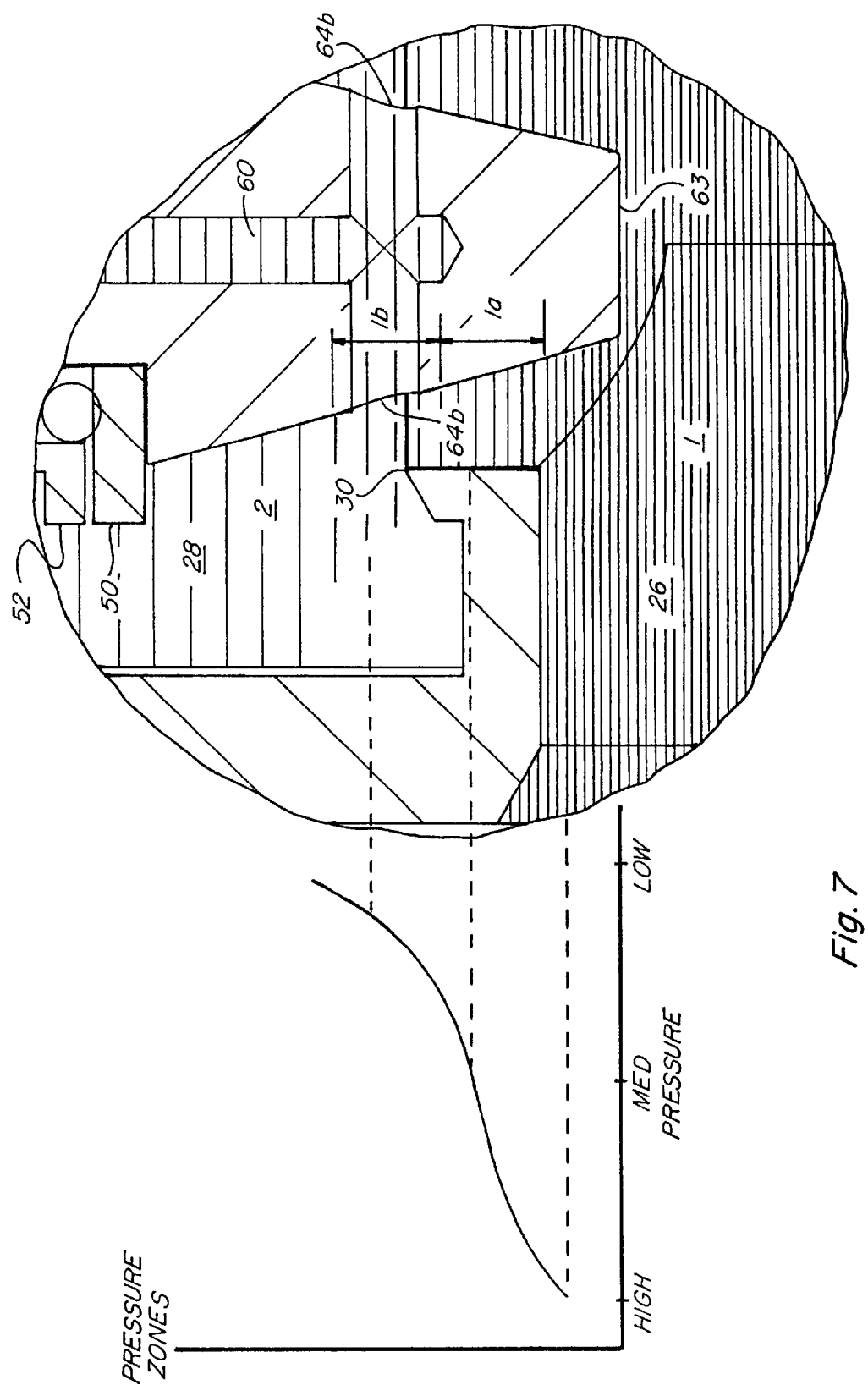
FIG. 7 is a similar view to FIG. 6 with the lateral port in a different position.

When the valve assembly is in an open condition as shown in FIGS. 4–7, there are zones of pressure generally above and below the valve port, in the restricted area between the nose 40 and the valve seat 30. Flow through an annular restricted area such as that between the contoured nose 42 and the valve port 32, occurs at a much higher velocity, and thus lower pressure, than occurs in the inlet chamber. These zones are shown somewhat idealistically as 1a and 1b. Zone 1 in the inlet chamber is the highest pressure in the system and zone 2 in the outlet chamber is the at a considerably lower pressure. In between these two zones 1 and 2 are pressure zones 1a and 1b, which are lower than pressure zone 1. In FIGS. 5, 6 and 7 pressure is shown by horizontal lines and it will be understood that the less the distance between these lines, the greater the pressure. Test data indicates that the average pressure distribution is as shown graphically to the left of FIGS. 5, 6 and 7.

When, as shown in FIG. 3, the equalization passage lower port 64 is located at the tip of the nose piece 42, which is located well into the inlet chamber 26, the valve inlet pressure is experienced above the piston throughout the entire stroke. However, the pressure on the nose piece 42 is lower than the inlet pressure experienced at the upper end of the piston with the result that the piston is no longer balanced. The downward force at the upper end of the piston is greater than the upward force on the nose piece 42 and there is a resultant downward force in the closing direction.

The downward force can be reduced if the pressure on the upper end of the piston can be lowered. It has been discovered that this can be achieved by locating the equalization passage inlet port in a lower pressure zone such as 1a or 1b, as opposed to said lower port being in zone 1 as shown in FIG. 5.

Thus, if as shown in FIG. 6 a transverse passage is provided having opposed equalization passage lower ports located in a selected pressure zone this will be the pressure experienced above the piston in the valve chamber 22. The transverse or lateral passage is shown as a through hole, which is easier to manufacture, but could be on one side only of the axial passage if desired. The equalization inlet ports 64a can be located in zone 1a so that the force at the upper end of the piston is reduced and, by experimentation, the location can be selected so that the closing force is closer to being equal to the opening force throughout the stroke.

On the other hand, if it is desired that the closing force be less than the opening force, the equalization passage inlet ports 64b can be located in zone 1b as shown in FIG. 7 so that the force at the upper end of the piston is reduced still further and by experimentation the optimum location of the lower ports can be determined that provides a more balanced piston at high flow conditions.

More specifically, consider a valve having a maximum stroke S of 0.500" measured from the underside of the piston abutment 50 to the valve seat 30. Experimentation has shown that for a valve of the frusto-conical configuration shown, a distance of 0.300", or 60% into the 0.500" stroke, tends to be the position where imbalance forces are at a maximum.

Tests have shown that with an axial inlet port 64 at the end of the nose piece 42 and a pressure drop of 200 psi across the valve, e.g., with an inlet pressure of 200 psi above outlet pressure, there is an imbalance force in the closing direction of 30 lb.

The imbalance forces may be reduced with a lateral port balanced system. The pressure above the piston drops as the piston moves to a more open position when the equalization passage lower port is located in a lower pressure zone. This is desirable because the size of the low pressure area around the nose piece 42 increases as the nose piece moves out of the port. Tests have shown that the maximum imbalance throughout the 0.500" stroke is reduced to 7 lb with a 200 psi pressure drop. This 7 lb force is less than 25% of the imbalance force of 30 lb experienced when the equalization passage lower port is axially disposed and located at the tip of the nose.

When the lateral lower port 64b is located in a pressure zone which is too low such as zone 1b shown in FIG. 7, the pressure above the piston will drop too low before the nose piece is sufficiently out of the valve port 42. The result is that there is an imbalance force in the opening direction.

There are significant advantages realized by being able to control and reduce piston imbalance forces. Among these advantages are the reduced power needed for the actuator moving the piston, reduced wear, and increased reliability.

It will be understood that because of the wide variety of port sizes, strokes and nose piece designs the optimum location of the inlet port relative to the variable pressure zones must be selected using empirical techniques.

Figure 8:
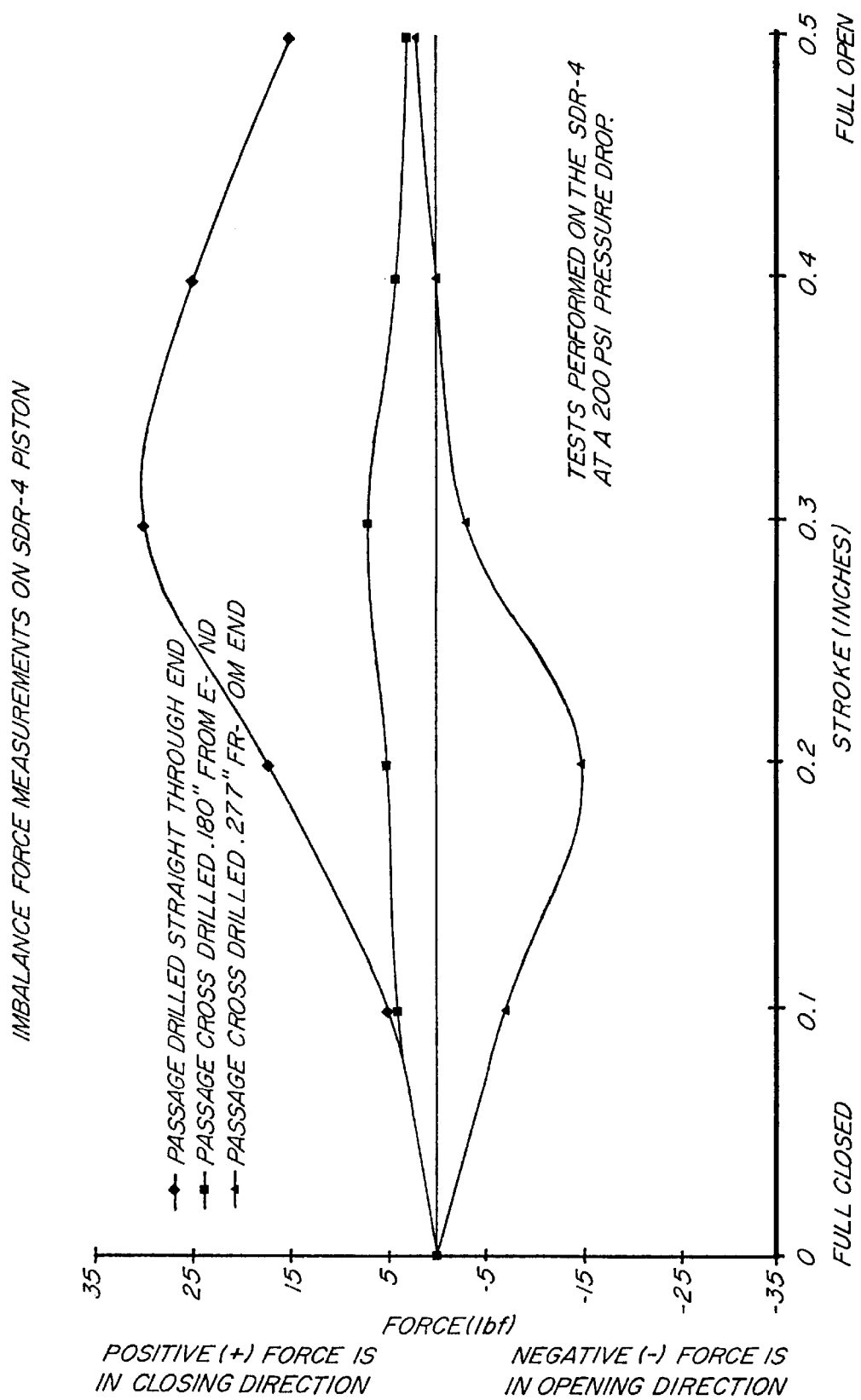
FIG. 8 is a graphical representation of the pressure/stroke characteristics of the valves shown in FIGS. 5, 6 and 7 respectively.

The chart of FIG. 8 shows graphically the results discussed above with a valve having the following characteristics:

| | |
|---|---|
| Nose piece length | .552" |
| Diameter Max. | .490" |
| Diameter Min. | .215" |
| Dimension A | .500" |
| Included Angle | 28° |

As shown on the chart with the equalization passage lower port in the nose piece tip, there is a maximum imbalance force of 30 lb in the closing direction. With equalization passage lateral lower ports located 0.180" from the tip of the nose piece, in zone 1a, there is a maximum imbalance force of only 7 lb. However, with the equalization passage lateral lower ports 64b located 0.277" from the tip there is a force of 15 lb in the opening direction.

Although the invention has been described by making detailed reference to preferred embodiments, such detail is to be understood in an instructive rather than in any restrictive sense, many other variants being possible within the scope of the claims hereunto appended.

I claim:

1. A flow control valve for a refrigeration system, the valve comprising:
   (a) a body including an inlet, an outlet, and a passage communicating between said inlet and outlet and a valve chamber;
   (b) a valve port in the passage defined by a valve seat;
   (c) a valve assembly movably mounted in the valve chamber, the valve assembly including a piston movable throughout a valve stroke between a closed position in which a piston seat is in abutment with the valve seat and an open position in which the piston seat is spaced from the valve seat, the piston being capable of modulation and subject to imbalance forces throughout the valve stroke; and
   (d) actuator means for moving the valve assembly toward and away from the valve seat;
   (e) said piston and said valve seat defining a zone of pressure lower than the inlet pressure when said piston is in the open position, said piston having an equalization passage with an upper port and a lower port, the upper port communicating with the valve chamber during modulation, and the lower port being located to communicate with the zone of lower pressure to reduce imbalance forces experienced by the piston throughout the valve stroke.

2. The flow control valve as defined in claim 1 wherein said equalization passage includes a lateral passage defining the lower port and being located a predetermined distance from an end face of the piston to reduce imbalance forces experienced by the piston.

3. The flow control valve as defined in claim 2 wherein said piston includes a nose piece having a frusto-conical configuration, said frusto-conical nose piece and said valve seat defining the zone of reduced pressure lower than the inlet pressure when said nose piece is in the open position, said equalization passage including a lateral passage defining the lateral port extending through the frusto-conical nose piece at a predetermined distance from an end face of the nose piece to reduce imbalance forces experienced by the piston throughout the valve stroke.

4. A flow control valve for a refrigeration system, the valve comprising:
   (a) a body including an inlet, an outlet, and a passage communicating between said inlet and outlet and a valve chamber;
   (b) a valve port in the passage defined by a valve seat;
   (c) a valve assembly movably mounted in the valve chamber, the valve assembly including a piston movable between a closed position in which a piston seat is in abutment with the valve seat and an open position in which the piston seat is spaced from the valve seat, the piston being capable of modulation and subject to imbalance forces in the open position; and
   (d) actuator means for moving the valve assembly toward and away from the valve seat;

(e) said piston and said valve seat defining a zone of pressure lower than the inlet pressure when said piston is in the open position, said piston having an equalization passage with an upper port and a lower port, the upper port communicating with the valve chamber during modulation, and the lower port being located to communicate with the zone of lower pressure to control imbalance forces experienced by the piston during modulation;

(f) said equalization passage including a lateral passage defining the lower port and being located a predetermined distance from an end face of the piston to selectively locate the lower port in the zone of lower pressure and control imbalance forces experienced by the piston; and (g) the zone of lower pressure including a first zone of pressure lower than the inlet pressure and a second zone of pressure lower than pressure in first zone of pressure; said lower port being selectively positioned in the first zone or second zone to control piston imbalance forces; said imbalance forces including closing forces urging the piston to the closed position and opening forces urging the piston to the open position.

5. The flow control valve as defined in claim 4 wherein said lower port is disposed in the first zone of pressure to reduce closing forces experienced by the piston.

6. The flow control valve as defined in claim 4 wherein said lower port is disposed in the second zone of pressure to increase opening forces experienced by the piston.

7. A flow control valve for a refrigeration system, the valve comprising:

(a) a body including an inlet, an outlet, and a passage communicating between said inlet and outlet and a valve chamber;

(b) a valve port in the passage defined by a valve seat;

(c) a valve assembly movably mounted in the valve chamber, the valve assembly including a piston movable between a closed position in which a piston seat is in abutment with the valve seat and an open position in which the piston seat is spaced from the valve seat, the piston being capable of modulation and subject to imbalance forces in the open position; and (d) actuator means for moving the valve assembly toward and away from the valve seat;

(e) said piston and said valve seat defining a zone of pressure lower than the inlet pressure when said piston is in the open position, said piston having an equalization passage with an upper port and a lower port, the upper port communicating with the valve chamber during modulation, and the lower port being located to communicate with the zone of lower pressure to control imbalance forces experienced by the piston during modulation;

(f) said equalization passage further including a lateral passage defining the lower port and spaced from a piston seat a distance less than the stroke of the piston.

* * * * *